(12) United States Patent
Kuijper et al.

(10) Patent No.: US 12,270,602 B2
(45) Date of Patent: Apr. 8, 2025

(54) METHOD OF PREPARING A CRYOGENIC SAMPLE WITH IMPROVED COOLING CHARACTERISTIC

(71) Applicant: FEI Company, Hillsboro, OR (US)

(72) Inventors: Maarten Kuijper, Eindhoven (NL); Hervé Remigy, Eindhoven (NL); Mathijs Petrus Wilhelmus Van Den Boogaard, Eindhoven (NL); Adrian Koh, Eindhoven (NL); Ivanka Spee, Eindhoven (NL); John Hazenberg, Eindhoven (NL); Marius Van Der Does, Eindhoven (NL)

(73) Assignee: FEI Company, Hillsboro, OR (US)

( * ) Notice: Subject to any disclaimer, the term of this patent is extended or adjusted under 35 U.S.C. 154(b) by 0 days.

(21) Appl. No.: 18/643,866

(22) Filed: Apr. 23, 2024

(65) Prior Publication Data

US 2024/0271850 A1    Aug. 15, 2024

Related U.S. Application Data

(63) Continuation of application No. 17/709,398, filed on Mar. 30, 2022, now Pat. No. 11,994,341.

(30) Foreign Application Priority Data

Mar. 31, 2021    (EP) ..................... 21166358

(51) Int. Cl.
*F25D 3/10* (2006.01)
*F25D 29/00* (2006.01)
*G01N 1/42* (2006.01)

(52) U.S. Cl.
CPC ............. *F25D 3/10* (2013.01); *F25D 29/001* (2013.01); *G01N 1/42* (2013.01)

(58) Field of Classification Search
CPC ........... F25D 3/10; F25D 29/001; G01N 1/42; G01N 1/2813; G01N 23/2202
See application file for complete search history.

(56) References Cited

U.S. PATENT DOCUMENTS 10,672,587 B2 *   6/2020   Rémigy ................. H01J 37/261
2012/0255313 A1 * 10/2012   Katkov .................... F25D 3/102
                                                                     62/51.1

(Continued)

FOREIGN PATENT DOCUMENTS

EP    2381236 A1 *  10/2011   ............... G01N 1/42
GB    2371108 A   *   7/2002   ............... F17C 7/02

*Primary Examiner* — Francis C Gray
(74) *Attorney, Agent, or Firm* — Klarquist Sparkman, LLP

(57) ABSTRACT

The invention relates to a method and an apparatus for preparing a cryogenic sample, whereby the sample is subjected to rapid cooling using a cryogen. A pair of conduits for transporting cryogenic fluid are provided, each of which conduits opens out into a mouthpiece, which mouthpieces are arranged to face each other across an intervening gap, wherein in the gap a sample that is provided on a substantially planar sample carrier can be received. Cryogenic fluid can be pumped through the conduits so as to concurrently flush from the mouthpieces and suddenly immerse the sample in cryogenic fluid from two opposite sides. As defined herein, at least one of the mouthpieces comprises at least two nozzle openings for evenly cooling the substantially planar sample carrier during the flushing.

20 Claims, 10 Drawing Sheets

(56) References Cited

U.S. PATENT DOCUMENTS

2019/0170625 A1* 6/2019 Nijpels .................. H01J 37/20
2019/0180974 A1* 6/2019 Rémigy .................. H01J 37/20
2022/0381656 A1* 12/2022 Bormans ................. G01N 1/30

* cited by examiner

METHOD OF PREPARING A CRYOGENIC SAMPLE WITH IMPROVED COOLING CHARACTERISTIC

CROSS REFERENCE TO RELATED APPLICATIONS

This is a Continuation of U.S. patent application Ser. No. 17/709,398, filed Mar. 30, 2022, which claims the benefit of European application 21166358 filed Mar. 31, 2021, both of which are hereby incorporated by reference in entirety.

DESCRIPTION

The invention relates to a method of preparing a cryogenic sample, whereby the sample is subjected to rapid cooling using a cryogen, and comprising the steps of providing a sample on a substantially planar sample carrier, providing two conduits for transporting cryogenic fluid, each of which conduits opens out into a mouthpiece, which mouthpieces are arranged to face each other across an intervening gap, and placing the sample carrier with said sample in said gap and pumping cryogenic fluid through said conduits so as to concurrently flush from said mouthpieces, thereby suddenly immersing the sample in cryogenic fluid from two opposite sides. The invention additionally relates to an apparatus for performing such a method.

The term "cryogen" should be interpreted as referring to a liquid at cryogenic temperatures, i.e. at or below −150° C. Examples of such cryogens include liquid ethane, liquid propane, liquid oxygen, and mixtures hereof.

Charged particle microscopy is a well-known and increasingly important technique for imaging microscopic objects, particularly in the form of electron microscopy. Historically, the basic genus of electron microscope has undergone evolution into a number of well-known apparatus species, such as the Transmission Electron Microscope (TEM), Scanning Electron Microscope (SEM), and Scanning Transmission Electron Microscope (STEM), and also into various sub-species, such as so-called "dual-beam" tools (e.g. a FIB-SEM), which additionally employ a "machining" Focused Ion Beam (FIB), allowing supportive activities such as ion-beam milling or Ion-Beam-Induced Deposition (IBID), for example. More specifically: In a SEM, irradiation of a sample by a scanning electron beam precipitates emanation of "auxiliary" radiation from the sample, in the form of secondary electrons, backscattered electrons, X-rays and photoluminescence (infrared, visible and/or ultraviolet photons), for example; one or more components of this flux of emanating radiation is/are then detected and used for image accumulation purposes. In a TEM, the electron beam used to irradiate the sample is chosen to be of a high-enough energy to penetrate the sample (which, to this end, will generally be thinner than in the case of a SEM sample); the flux of transmitted electrons emanating from the sample can then be used to create an image. When such a TEM is operated in scanning mode (thus becoming a STEM), the image in question will be accumulated during a scanning motion of the irradiating electron beam.

As an alternative to the use of electrons as irradiating beam, charged particle microscopy can also be performed using other species of charged particles. In this respect, the phrase "charged particle" should be broadly interpreted as encompassing electrons, positive ions (e.g. Ga or He ions), negative ions, protons and positrons, for instance.

It should be noted that, in addition to imaging and performing (localized) surface modification (e.g. milling, etching, deposition, etc.), a charged particle microscope may also have other functionalities, such as performing spectroscopy, examining diffractograms, etc.

In all cases, a Charged Particle Microscope (CPM) will comprise at least the following components: A radiation source, such as a Schottky electron source or ion gun. An illuminator, which serves to manipulate a "raw" radiation beam from the source and perform upon it certain operations such as focusing, aberration mitigation, cropping (with an aperture), filtering, etc. It will generally comprise one or more (charged-particle) lenses, and may comprise other types of (particle-)optical component also. If desired, the illuminator can be provided with a deflector system that can be invoked to cause its output beam to perform a scanning motion across the sample being investigated. A sample holder, on which a sample under investigation can be held and positioned (e.g. tilted, rotated). If desired, this holder can be moved so as to effect scanning motion of the beam with respect to the sample. In general, such a sample holder will be connected to a positioning system such as a mechanical stage. The holder may comprise means to maintain the sample in a given (hot or cold) temperature range; in the specific context of the current invention, it will typically comprise means for maintaining the sample at cryogenic temperatures. A detector (for detecting radiation emanating from an irradiated sample), which may be unitary or compound/distributed in nature, and which can take many different forms, depending on the radiation being detected. Examples include photodiodes, CMOS detectors, CCD detectors, photovoltaic cells, X-ray detectors (such as Silicon Drift Detectors and Si(Li) detectors), etc. In general, a CPM may comprise several different types of detector, selections of which can be invoked in different situations.

In the case of a transmission-type microscope (such as a (S)TEM, for example), the CPM will also comprise: An imaging system, which essentially takes charged particles that are transmitted through a sample (plane) and directs (focuses) them onto analysis apparatus, such as a detection/imaging device, spectroscopic apparatus (such as an EELS module; EELS=Electron Energy-Loss Spectroscopy), etc. As with the illuminator referred to above, the imaging system may also perform other functions, such as aberration mitigation, cropping, filtering, etc., and it will generally comprise one or more charged-particle lenses and/or other types of particle-optical components.

In what follows, the invention will—by way of example—often be set forth in the specific context of electron microscopy. However, such simplification is intended solely for clarity/illustrative purposes, and should not be interpreted as limiting.

Biological specimens (such as cells, cell components, single-cellular organisms, etc.) that need to be stored and studied in a body of aqueous liquid (such as water, electrolyte, cell fluid, blood plasma, etc.) can present significant challenges vis-à-vis their examination in a CPM, since: An aqueous liquid introduced into a (quasi-)vacuum environment of a CPM will start to outgas/boil, thus tending to degrade the specimen; In order to prevent this, a sample (specimen+aqueous liquid) can first be frozen before being introduced into said vacuum; However, so as to prevent damage to the specimen caused by the formation of (sharp) ice crystals, such freezing must generally be performed very rapidly, with the aim of achieving sample vitrification (solidification into an amorphous, glass-like phase) without significant ice crystallization.

In order to facilitate such vitrification—but also to allow the sample to be studied in a transmission-type CPM, such as a TEM—the sample should be relatively thin (sheet-like), but one should still be able to support it by its edges (so that the employed means of support have no significant effect on beam penetration). To this end, use if typically made of a grid-like holder (such as a so-called TEM Autogrid®), across which a perforated membrane (such as a so-called "holey carbon film") is spanned, in whose perforations a small quantity of sample can be held (by surface tension effects). See FIG. 1, for example.

A method as set forth in the opening paragraph above is known from US 2017/0169991 A1 (also published as EP3179229A1) and from US 2019/0180974 A1 (also published as EP3495798A1), which has the same inventor/assignee as the current application, and is incorporated herein by reference. The techniques set forth in said documents produced a significant improvement compared to the prior-art techniques that pre-dated it.

It is an object of the invention to provide an improved method of preparing cryogenic samples by vitrification. In particular, it is an object of the invention that such a method should produce more consistent results as compared to prior-art techniques, as well as more consistent results over the entire sample.

These and other objects are achieved in a method of preparing a cryogenic sample as defined by claim 1. In the method, the sample is subjected to rapid cooling using a cryogen. The method comprises the steps of providing a sample on a substantially planar sample carrier; providing two conduits for transporting cryogenic fluid, each of which conduits opens out into a mouthpiece, which mouthpieces are arranged to face each other across an intervening gap; and placing the sample carrier with said sample in said gap. As defined herein, the method comprises the step of pumping cryogenic fluid through said conduits so as to concurrently flush from said mouthpieces, thereby suddenly immersing the sample in cryogenic fluid from two opposite sides.

According to the method, at least one of said mouthpieces comprises at least two nozzle openings. The nozzle openings are arranged for more evenly distributing the liquid cryogen over at least one side of said sample carrier. The nozzle openings allow for more evenly cooling said substantially planar sample carrier during said flushing. By providing at least two nozzle openings, it is possible to cool the entire surface of the sample carrier more evenly, as the jets emanating from the at least two nozzle openings are able to cool two distinct parts of the sample carrier at once. With this, two distinct parts of the sample carrier can be vitrified at the same time, which leads to improved sample quality over a larger part of the sample carrier.

With the two nozzle openings it is possible, for example, that a peripheral part of the sample carrier is cooled at least at the same time as a centre part of the sample carrier. This is advantageous as it allows vitrification of the sample to occur substantially concurrently in a perimeter part of the sample carrier and in a centre part of the sample carrier. This holds particularly true in case the sample carrier is pre-assembled in a mechanical contour for improving the handling of the substantially planar sample carrier. Such a mechanical contour is known per se, for example in the form of a so-called clip ring (also referred to as AutoGrid). Such a mechanical contour normally has relatively large dimensions (and thus a relatively large mass) compared to the substantially planar sample carrier. Due to the relative larger mass, the mechanical contour retains a lot of heat during the flushing with cryogenic cooling. This may lead to a sample carrier that is relatively colder compared to the mechanical contour, and in effect heat transfer may take place from the mechanical contour to the sample carrier. To prevent this, the invention as described herein provides at least two nozzle openings for evenly cooling said substantially planar sample carrier during said flushing. With this, improved vitrification of the sample is obtained and the object as defined herein is achieved.

It is noted that EP 3 475 681 B1 discloses a method of preparing a sample for imaging under cryogenic conditions, wherein a jet of liquid coolant is used in such a way that the sample is vitrified first in the centre of the sample carrier and from there towards the edge of the sample carrier. This approach, however, was found to be not ideal as it does not allow the perimeter part of the sample carrier to be cooled at least at the same time as the centre part of the sample carrier. This may reduce the overall sample quality. In contrast, the invention as described herein provides at least two nozzle openings for evenly cooling said substantially planar sample carrier during said flushing. With this, vitrification of the sample may occur more evenly over the entire sample carrier, and the nozzle openings may be arranged for cooling a peripheral part of the sample carrier at least at the same time as a centre part of the sample carrier. Additionally, the at least two nozzles may be used for countering a heat flux from the mechanical contour to the sample carrier, so that the sample is cooled and vitrified more evenly, even when a mechanical contour is used.

Advantageous embodiments will be described below.

In an embodiment, said at least two nozzle openings comprise a central nozzle that is arranged for cooling a central part of said substantially planar sample carrier, and at least a peripheral nozzle that is arranged for cooling a peripheral part of said substantially planar sample carrier. This way, the periphery of the sample carrier can be cooled at least at the same time as the central part of the sample carrier. It is conceivable that the periphery of the sample carrier is cooled earlier in time than the central part of the sample carrier. This is advantageous in case a mechanical contour is used. By using a central nozzle and at least a peripheral nozzle, it is possible to counter the aforementioned heat transfer from the mechanical contour to the peripheral part of the sample carrier by cooing the peripheral part a little bit earlier than the central part. This aids in a more uniform cooling and vitrification of the sample on the sample carrier.

In an embodiment, said at least two nozzle openings are arranged for providing substantially identical flushes of cryogenic fluid on said substantially planar sample carrier. Flushes may be substantially identical in terms of one or more of the following: temperature, cooling agent, flow rate, flow duration, flow pressure, flow velocity, total flow, and flow size.

In another embodiment, said at least two nozzle openings are arranged for providing substantially unequal flushes of cryogenic fluid on said substantially planar sample carrier.

In an embodiment, said central nozzle is arranged for establishing a lower flush of cryogenic fluid compared to said at least one peripheral nozzle.

In an embodiment, said central nozzle and said peripheral nozzle are substantially identical in size. This way the affected area of the sample carrier by each of the nozzles is substantially the same. In another embodiment, the central nozzle has smaller dimensions compared to the at least one peripheral nozzles. This allows the peripheral nozzles to be cooled a bit more, so that more evenly cooling and vitrification of the entire sample on the sample carrier can be obtained.

It is conceivable that at least one of the mouthpieces comprises a plurality of peripheral nozzles. In particular, an embodiment with two, three, four or five peripheral nozzles will provide more evenly cooling of the entire sample carrier. The peripheral nozzles may be evenly arranged about the circumference of the mouthpiece, in particular evenly arranged about the central nozzle.

In an embodiment, said nozzle plate comprises at least six peripheral nozzles. The six peripheral nozzles may be evenly arranged about said central nozzle. It was found that this arrangement provides excellent results with respect to a more even temperature distribution over the entire sample carrier during flushing with cryogenic fluid. Each nozzle will allow for more local cooling of the sample carrier at a given time. The peripheral nozzles may be substantially equal in size. The central nozzle may be equal in size to the peripheral nozzles, or the central nozzle may be slightly smaller compared to the peripheral nozzles.

As defined herein, one of the mouthpieces comprises at least two nozzle openings. It is conceivable that the other one of the two mouthpieces also comprises at least two nozzle openings. These at least two nozzle openings will also be referred to hereinafter as "further nozzle openings". The nozzle openings provide more evenly cooling of a first side of the sample carrier, and the further nozzle openings provide more evenly cooling of an opposite side of the sample carrier. By providing the nozzle openings and the further nozzle openings, a more evenly cooling is possible on both sides of the sample carrier, in ways similar as already explained hereinbefore by means of the at least two nozzle openings. A more uniform cooling may be provided, wherein the cooling may be equal on both sides of the sample carrier, or wherein the cooling may be substantially different on both sides of the sample carrier.

In an embodiment, the further nozzle openings comprise a single central nozzle opening, and six peripheral nozzle openings provided evenly distributed about the central nozzle opening. The two mouthpieces may be, in this embodiment, embodied similarly, i.e. each having a central nozzle opening and six peripheral nozzle openings, wherein each of the nozzle openings substantially has the same dimensions.

The nozzle openings in a single mouthpiece may be directly connected to the corresponding conduit, so that a single conduit can be used for transporting cryogenic liquid to the available nozzle openings. It is conceivable, however, that each nozzle opening comprises its own conduit. Ways of providing a cryogenic fluid to a specific nozzle opening are known per se to those skilled in the art. In an embodiment, the mouthpiece may be formed as a nozzle plate that covers a single conduit, wherein the nozzle openings are provided in the nozzle plate. This allows for a single conduit to deliver the desired cryogenic fluid to all of the nozzle openings in the nozzle plate.

In an embodiment, the flush of cryogenic fluid applied from a first of said mouthpieces is reduced after a given time interval, such that the flush of cryogenic fluid from said first of said mouthpieces is different to that applied from the second of said mouthpieces. This produces deliberate asymmetry/disparity as regards the cooling of the sample's backside (facing one of said mouthpieces) and frontside (facing the other of said mouthpieces).

In another embodiment, the flush of cryogenic fluid applied from a first of said mouthpieces is altered after a given time interval, such that the flush of cryogenic fluid from said first of said mouthpieces after said time interval is different to the flush of cryogenic fluid from said first of said mouthpieces before said time interval. In an embodiment, the flush from one of said nozzles is altered, whilst a flush from another one of said nozzles remains the same. This allows, for example, to reduce or eliminate a flush from the central nozzle opening whilst keeping the flush from a perimeter nozzle constant. This would aid in providing protection for the sample provided on the sample carrier.

In another embodiment, the flush of cryogenic fluid applied from a first of said mouthpieces is substantially identical to the flush of cryogenic fluid applied from a second of said mouthpieces.

For completeness, it should be realized that the cryogenic fluid that is flushed from the mouthpieces may be a liquid or a (dry) gas/vapor, and it may be the same or different for each mouthpiece, and even same or different for different nozzle openings; in general, liquids tend to be preferable over gas-phase fluids, inter alia because of the greater heat capacity of liquids, and the relative ease with which they can be stored and pumped. It should also be noted that, if desired, one or more of the at least two nozzle openings may contain a mesh (sieve) or other form of flow-path subdivision, e.g. so as to achieve laminar flow and/or a particular flow pattern. As alluded to above, this mesh need not be the same for both mouthpieces.

In an embodiment, reducing comprises the step of terminating the flush from said first mouthpiece after said given time interval. Hence, one side is cooled for a longer period, compared to the opposite side.

In a set-up according to the present invention, the cryogenic fluid may, for example, be pumped through the employed conduits using one or more (electric) pumps; these may be switched on/off as required, and/or a valve system can be used to open/close the flow in the conduits at will. Such a set-up allows, for example, the flow rate and/or flow duration in one of the conduits to be different to that in the other conduit.

In an alternative embodiment, use is made of a "manual pumping" set-up in which said conduits are arranged in a plunger, whereby each conduit has an entrance aperture on an underside of the plunger, and said gap is provided as a slot in a topside of the plunger; a bath of cryogenic fluid is provided beneath said plunger; and said sample is inserted into said slot using a tool that applies downward pressure on said plunger, thereby at least partially submerging the plunger and causing cryogenic fluid in said bath to flow into said entrance apertures and emerge through said mouthpieces.

Such a set-up effectively makes use of a fluid displacement mechanism similar to that used in a piston (whereby the plunger plays the role of the piston head [with overflow conduits], and the cryogenic bath is contained in the piston tube). It is similar to a set-up described in the aforementioned US 2017/0169991 A1. Modifications as described in the aforementioned US 2019/0180974 may be incorporated as well. These modifications allow to produce a different flush of cryogenic fluid from each of the mouthpieces. One way to achieve this is use a shutter to close off a first of said conduits—connected to said first mouthpiece—after a given time interval. A convenient way to perform such delayed shuttering is using a construction wherein, as the plunger is submerged into said bath, a first of said apertures, connected to said first conduit, engages with a lid (cover; blanking member) disposed at a selected distance d below a surface of said bath, which lid then co-moves with the plunger so as to keep said first aperture closed. Such a scenario is depicted in FIGS. 3A-3C, for example. If the plunger is submerged with a vertical velocity v, then d can be selected so as to engage the shutter at a given time t=d/v (e.g. in a range 10-100 milliseconds (ms), such as 40-60 milliseconds, for instance) after flushing/depression of the plunger commences. The shutter itself may, for example, be:

- Embodied to be intrinsically buoyant in the employed cryogen bath, and/or be caused to be artificially "buoyant", e.g. by biasing it upward using a spring mechanism, for instance. In this way, the shutter will revert/relax back upward (to a default/initial position) when the plunger disengages therefrom (on its upward/return "stroke").
- Be attached to a guide/rail that constrains its motion to a vertical path.
- Be curtailed from rising above a certain level (at depth d) using an adjustable stop.

In an embodiment as described in the previous paragraph, it should be noted that:

- The "tool" in question may, for example, be a tweezers or pliers, which can be used to grasp the specimen by its edge. Such a tool may, for example, contain a feature such as a protrusion, burl or local enlargement that engages with the top of the plunger (or some structure thereon) in order to convert insertive motion of the tool (in the slot) into (downward) co-motion of the plunger.
- The plunger may initially (shallowly) float in the cryogen bath, or may alternatively hang over the bath.
- Although the illustrations in FIGS. 3A-3C depict a scenario in which the sample plane is oriented vertically and the cryogenic fluid flushes from the mouthpieces horizontally, this does not necessarily have to be the case. Instead, one could, for example, construct a set-up in which the sample plane is oriented horizontally, the mouthpieces are arranged above and below it, and the cryogenic fluid flushes from the mouthpieces vertically. In both scenarios, it is desirable to have the (cumulative) lengths of both conduits substantially equal, so as to ensure substantially synchronous issuance of cryogenic fluid from both mouthpieces when the plunger is suitably submerged.
- The plunger may be made of various materials, as long as they are compatible (e.g. in terms of brittleness) with use at cryogenic temperatures. Examples include stainless steel, titanium and (certain) ceramics, for instance.

For substantially planar samples with oppositely-located major surfaces—such as a grid/membrane as referred to above, or a flake/piece of a wafer, for example—the following considerations provide (non-binding) guidance when applying the present invention:

- One can associate a terminal/extremal/circumferential perimeter with each of the mouthpieces. This will typically be circular, although this does not necessarily have to be the case.
- These perimeters will ideally be centred on a common axis.
- In case a central nozzle opening is used, this central nozzle opening may be aligned with this common axis.
- This common axis will intersect the plane of the (planar) sample at an (approximately) normal/perpendicular angle. The common axis will also ideally pass through a geometric center/centroid/barycenter of the sample.
- Nominally, the sample will be positioned so that it is equidistant from the mouthpieces (or—in the case of sample comprising a membrane spanned on a grid—so that the membrane is equidistant from the mouthpieces). If the sample/membrane is closer to a particular mouthpiece, then one can still ensure simultaneous commencement of flushing of the frontside and backside of the sample by, for example:
  - Slightly delaying pumping of cryogen into the conduit connected to that particular mouthpiece; or/and
  - Embodying the conduit connected to that particular mouthpiece to be slightly longer than that connected to the other mouthpiece.

With respect to the cryogen bath into which the sample is plunged, there are various possible choices as regards the cryogen used. For example, various practitioners report using a liquid ethane/propane mix. In a particular embodiment of the invention, the cryogen in the bath comprises liquid ethane (without substantial quantities of other constituents) at a temperature in the range −160° C. to −183° C. When vitrifying a sample by plunge-cooling it, one can tend to adhere to a rule of "the colder the better". However, at temperatures below ca. −183° C., it was observed that liquid ethane can tend to become so viscous as to possibly impede the plunging process, e.g. by clinging to the sample holder. Temperatures above this level (e.g. −175° C.) are therefore generally preferable.

In order to achieve satisfactory vitrification of the sample, its exposure to cryogenic fluid from the mouthpieces of the current invention should be relatively sudden—hence the term "flush". The use of two nozzle openings in at least one of the mouthpieces aids in the sudden exposure of cryogenic fluid over an increased area of the entire sample carrier. If exposure to the cryogenic fluid from the mouthpieces is more gradual/extended, then there is a risk that the sample will (at least partially) freeze into crystalline form rather than solidifying amorphously—which is undesirable in the context of the current invention. The nozzle openings can be tuned/optimized for establishing a desired flow in dependence on various factors, such as the thickness of (the grid/membrane of) the sample, the temperature of the employed cryogenic fluid, the pressure/flow pattern produced by the nozzle openings of the mouthpieces, etc. As a non-binding example, the uninterrupted flush from the at least two nozzle openings may have a nominal duration in a range of 5-200 milliseconds, for instance; in the case of a sample comprising a holey membrane on a grid, a somewhat longer duration will generally help to ensure that, in addition to producing vitrification of the aqueous film in the holey membrane, residual heat is removed to a satisfactory extent from the grid (and any associated supporting member), so as to prevent unwanted "reheating" of the membrane by heat leakage from the grid, or prevent unwanted "reheating" of the sample carrier by heat leakage from a mechanical support. After vitrification occurs, the aqueous film temperature will preferably remain below about −145° C., to prevent unwanted formation of crystalline ice. The skilled artisan will be able to choose the flush duration, tailored to the set-up and parameters pertaining to a given embodiment of the invention.

In an embodiment, the flushes from both mouthpieces commence substantially simultaneously, but the flush from said first mouthpiece is terminated after a given time interval. In a further embodiment, a shutter can be used to close off a first of said conduits, connected to said first mouthpiece, after said time interval.

In an embodiment, wherein as the plunger is submerged into said bath, a first of said apertures, connected to said first conduit, engages with a lid disposed at a selected distance below a surface of said bath, which lid then co-moves with the plunger so as to keep said first aperture closed.

In an embodiment, said plunger is surrounded by at least one seal element for preventing cryogenic fluid to leak when downwards pressure is applied on the plunger. The plunger may be surrounded by at least two seals. The second seal element may be arranged for opening an exhaust channel when the plunger is brought back towards a starting position.

In an embodiment, an overpressure may be provided in the bath beneath said plunger to ensure the conduits are filled with cryogenic fluid at the moment the sample-tool starts pushing the plunger downwards.

According to an aspect, an apparatus for performing the method as defined herein is provided. The apparatus is defined according to claim 13. The apparatus is arranged for preparing a cryogenic sample, whereby the sample is subjected to rapid cooling using a cryogen, and comprises:

A pair of conduits for transporting cryogenic fluid, each of which conduits opens out into a mouthpiece, which mouthpieces are arranged to face each other across an intervening gap, wherein in said gap a sample that is provided on a substantially planar sample carrier can be received;

A pumping mechanism, for pumping cryogenic fluid through said conduits so as to concurrently flush from said mouthpieces and suddenly immerse the sample in cryogenic fluid from two opposite sides.

As defined herein, the apparatus is characterized in that at least one of said mouthpieces comprises at least two nozzle openings for evenly cooling said substantially planar sample carrier during said flushing. Advantages of such an apparatus have been elucidated hereinbefore by means of the method.

Further embodiments are subject of the dependent claims.

The invention will now be elucidated in more detail on the basis of exemplary embodiments and the accompanying schematic drawings, in which.

Figure 3A:
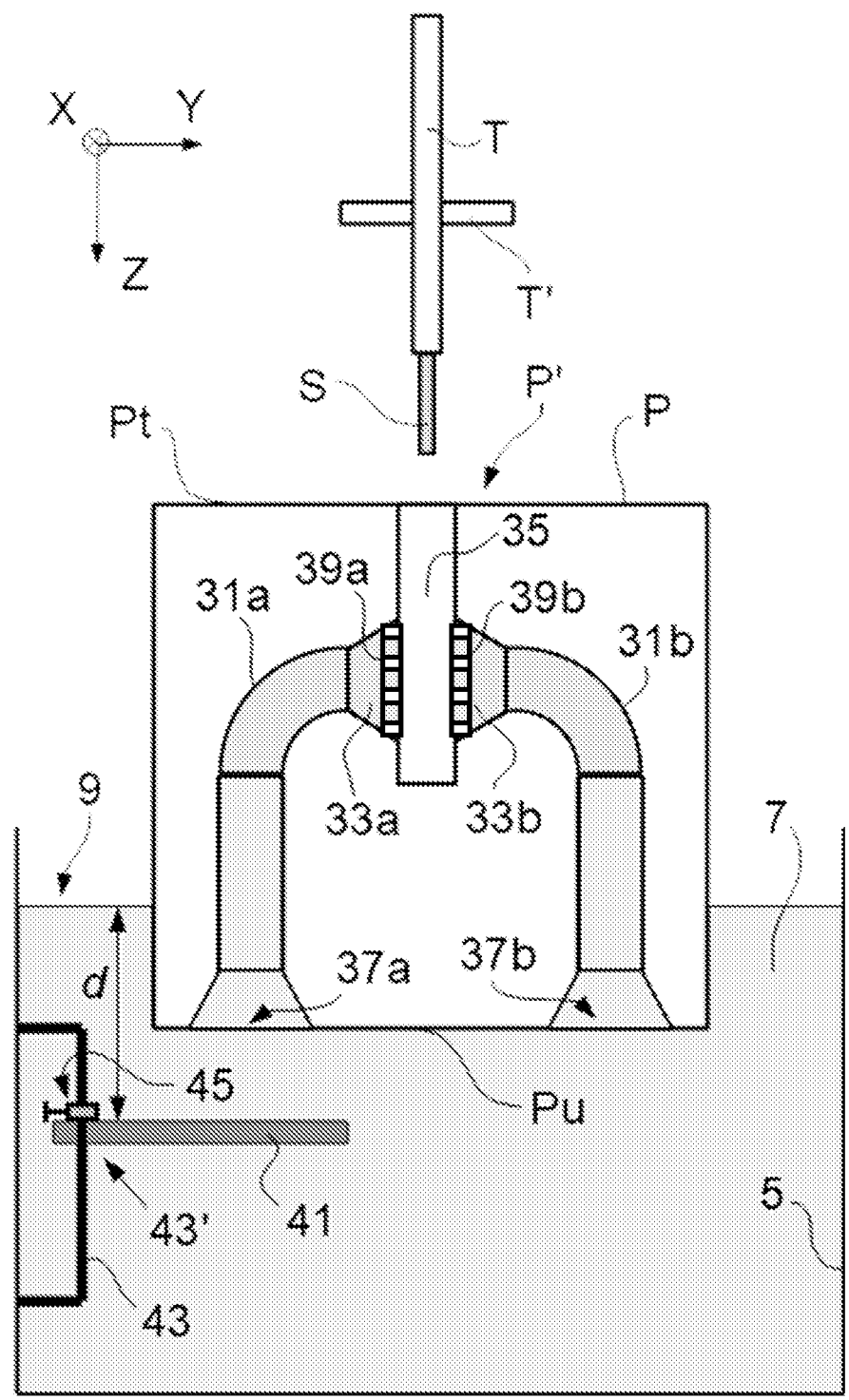
Figure 3B:
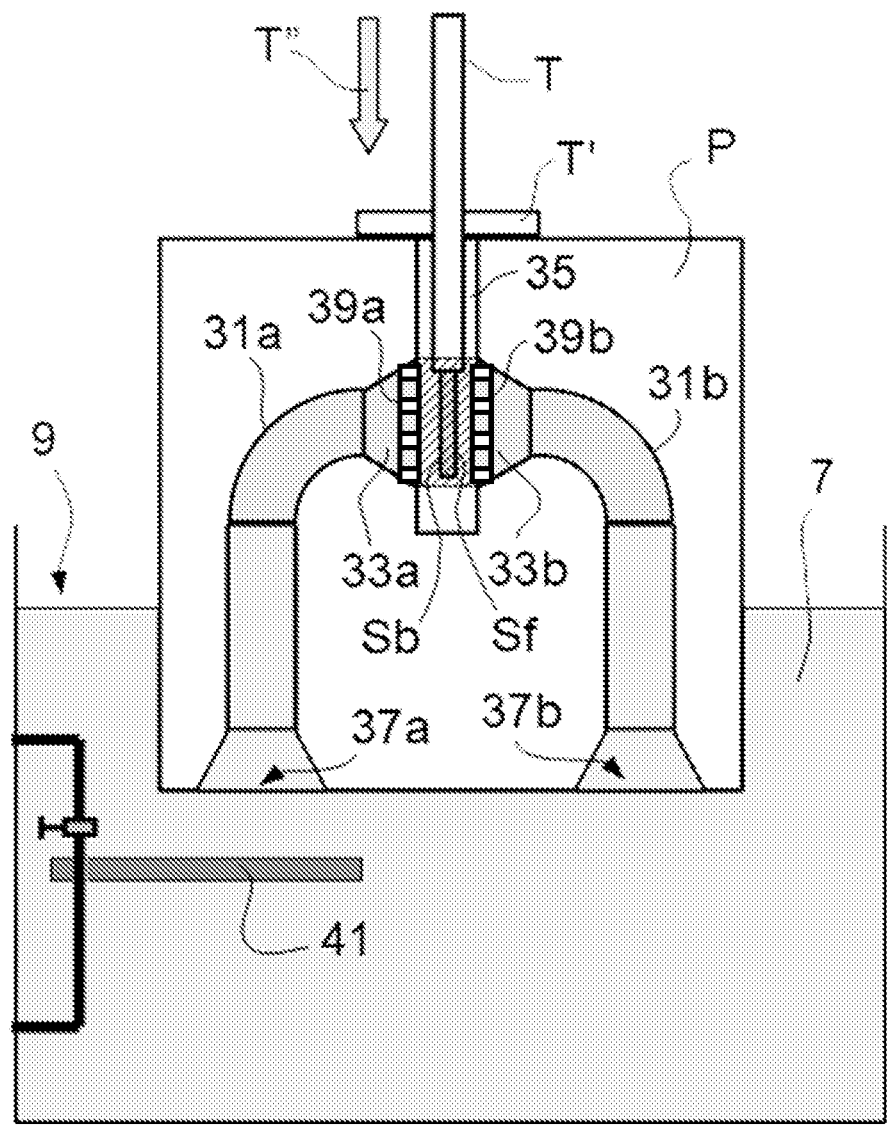
Figure 3C:
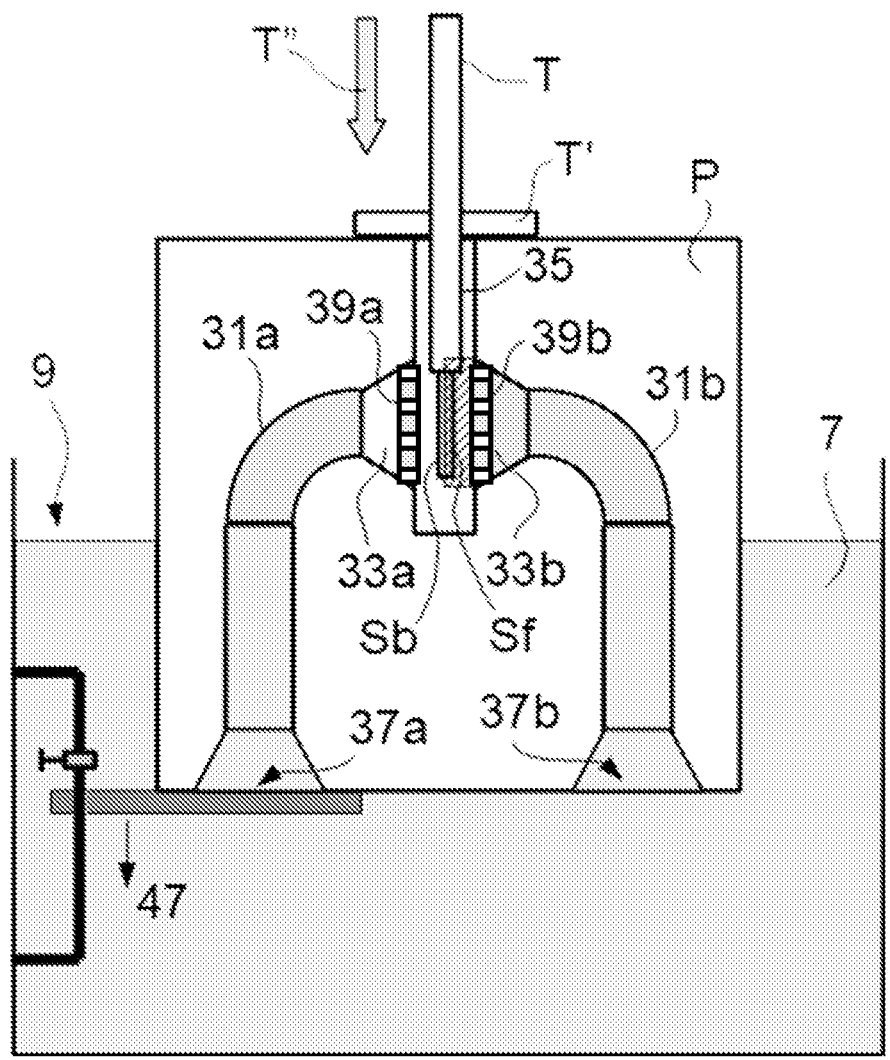

FIGS. 3A-3C render a longitudinal cross-sectional view of aspects of an embodiment of an apparatus according to the present invention (for enacting the inventive method).

Figure 4:
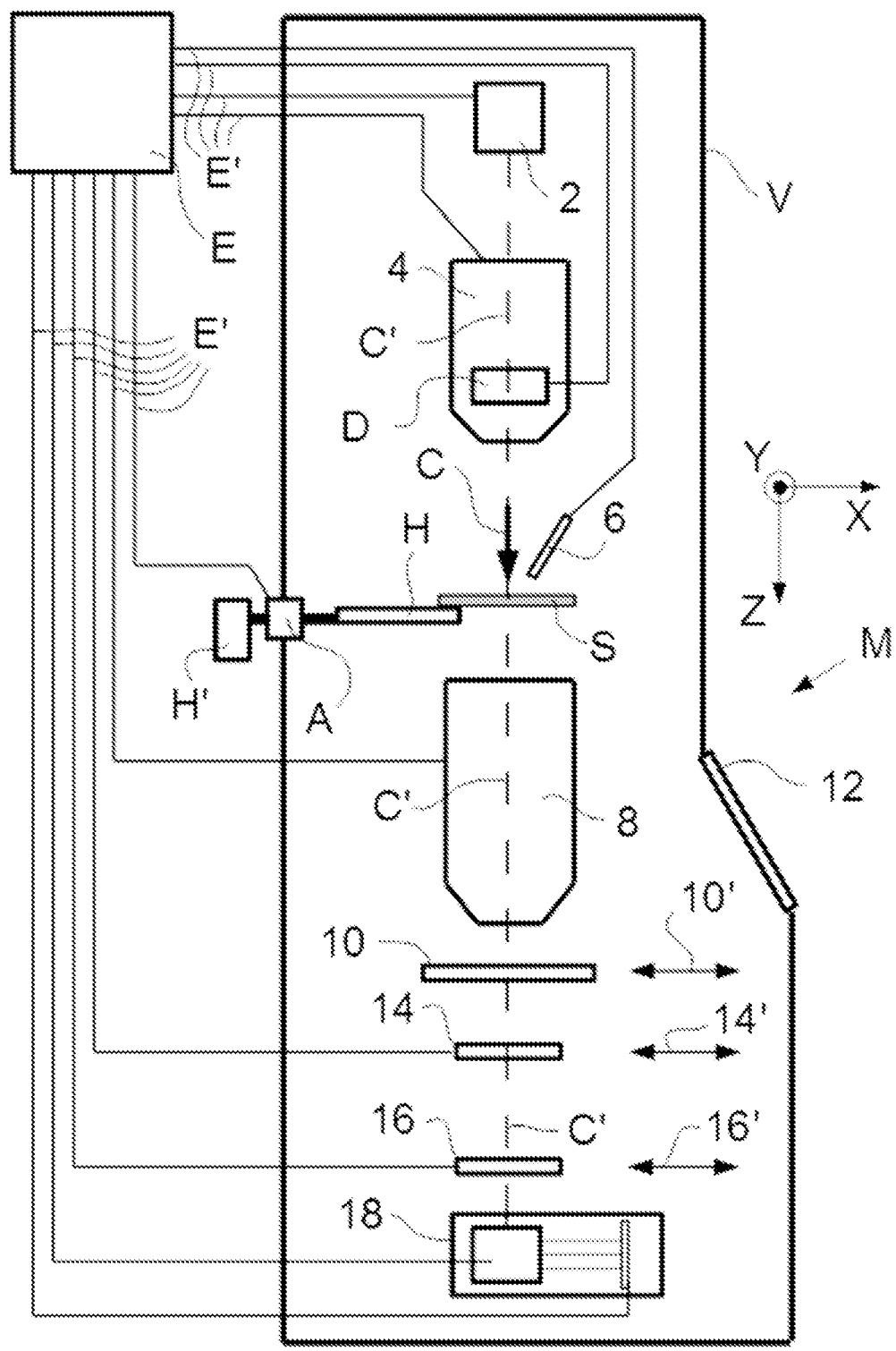

FIG. 4 renders a longitudinal cross-sectional view of a charged particle microscope that lends itself to use with the current invention.

Figure 6:
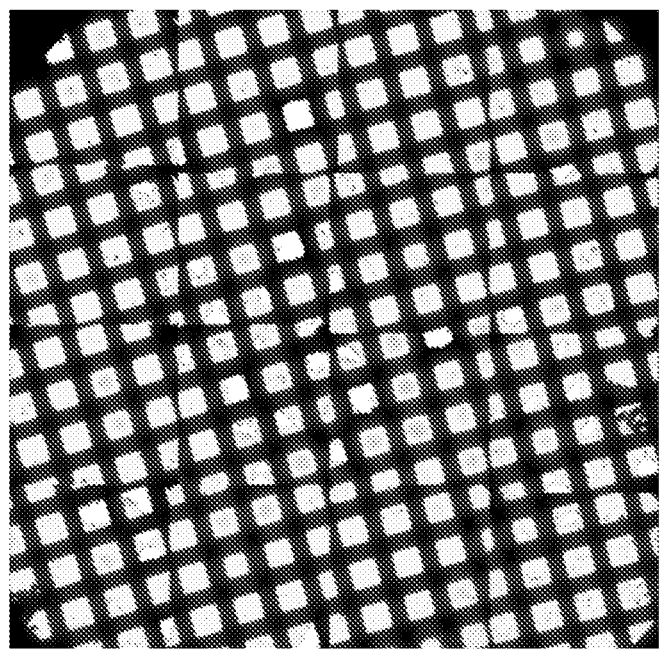
Figure 7:
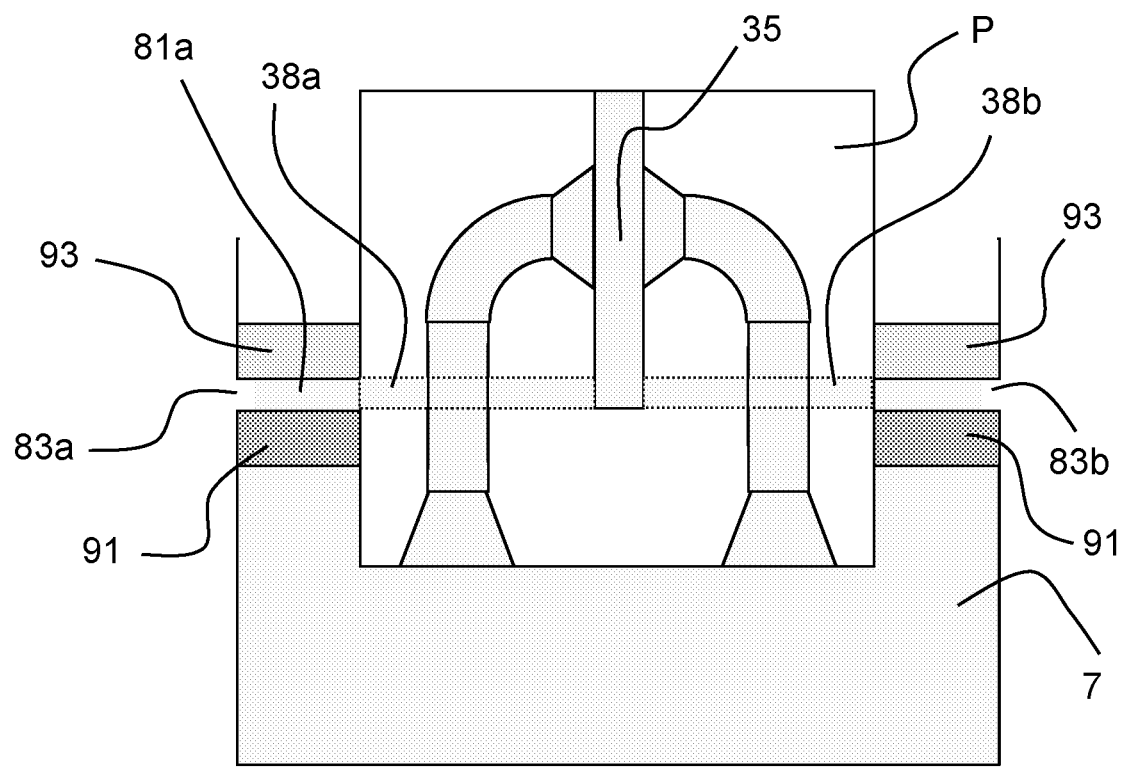

FIGS. 5A-5F schematically show embodiments of mouthpieces having at least two nozzle openings as defined herein;

FIG. 6 shows a sample that is vitrified using the method and device as described herein;

FIG. 7 shows a further embodiment of an apparatus according to the present invention.

In the Figures, where pertinent, corresponding parts may be indicated using corresponding reference symbols. It should be noted that, in general, the Figures are not to scale.

BACKGROUND EXAMPLE

Figure 1A:
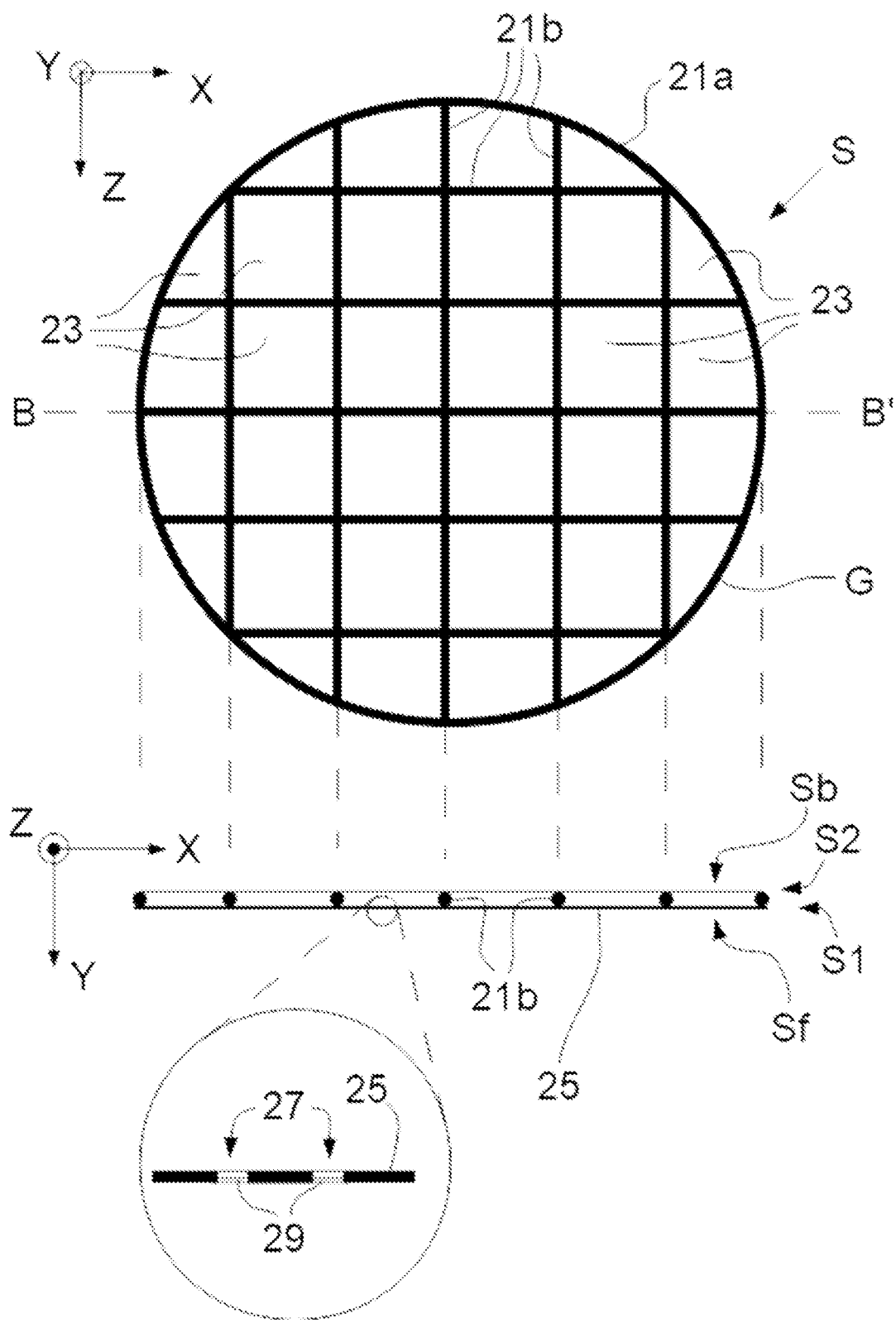
FIGS. 1A-1B illustrate (a particular embodiment of) a common sample structure used in vitrification procedures.

FIG. 1A renders detailed (magnified) views of aspects of a particular embodiment of a sample S that can be used in conjunction with the present invention. This particular type of sample S comprises what is often referred to as a "grid" G. It comprises a circular ring 21a of wire (e.g. comprising Cu or Ni, for instance), the diameter of the ring typically being of the order of about 3 mm and the diameter of the wire typically being of the order of about 20-100 m. Attached within the ring 21a are straight wire portions 21b, which are (in this case) arranged to form an orthogonal grid pattern, thus defining a matrix-like array of (substantially square) apertures (openings/holes/windows) 23. The middle portion of FIG. 1A shows a transverse cross-sectional view of the upper portion of the Figure, taken along the diameter B-B'. It shows that the grid G has a substantially planar (plate-like) form, with opposed first (S1) and second (S2) "faces" substantially parallel to one another. As here depicted, a membrane 25 has been spanned upon the first face S1 (and, optionally, affixed to the wires 21b, e.g. using an adhesive or by molten bonding). This membrane 25 may, for example, comprise a carbonaceous material such as nylon or graphene, and will typically have a thickness (in the Y direction) ranging from about 0.3 nm to hundreds of nm. The membrane 25 contains a distribution of perforations 27, which are clearly visible in the detailed view at the bottom of the Figure. These perforations 27 typically have a diameter (parallel to the XZ plane) in a range of ca. 1.2-3.5 m (e.g. ~2 μm). In essence, the grid G acts as a scaffold for the membrane 25, and the membrane 25 in turn acts as a supporting structure for the perforations 27 (so that it is sometimes referred to as a "holey carbon support"). It is within the perforations 27 that the ultimate "sample" or "specimen" is to be provided and supported—in the form of a thin film 29 of aqueous liquid (comprising one or more study specimens suspended therein) that is spanned across each given perforation 27, remaining in place (inter alia) by virtue of surface tension effects. It should be noted that structures as depicted in FIG. 1A (grid G+perforated membrane 25, 27) and as described above are commercially available, e.g. from firms such as Ted Pella, Inc., of Redding, California, USA. It is also possible to purchase (a variety of) pre-manufactured holey carbon films (corresponding to the perforated membrane 25, 27), e.g. from firms such as Quantifoil Micro Tools GmbH, Jena, Germany. Inter alia in the context of the present invention, the illustrated structure can be regarded as having a "backside" Sb and a "frontside" Sf.

A film 29 of aqueous liquid can be provided in the various perforations 27 of the membrane 25 using methods well described in technical literature and known to the skilled artisan. In one such known method, a sheet of blotting paper (not depicted) is pressed against the outer/lower surface of membrane 25, is then moistened with the aqueous liquid in question, and is subsequently removed (e.g. peeled off) of the membrane 25—causing (most of) the apertures 27 to be endowed with a (mini-)film 29 of the aqueous liquid, which is spanned within them by surface tension effects. A method of this type is described, for example, in the article Electron Microscopy of frozen water and aqueous solutions by J. Dubochet et al. in Journal of Microscopy, vol. 128, pt 3, December 1982, pp. 219-237, and will not receive further attention here. Reference is also made to an alternative method that is set forth in U.S. Pat. No. 9,772,265 (with the same inventor/assignee as the present application, and incorporated herein by reference).

Figure 1B:
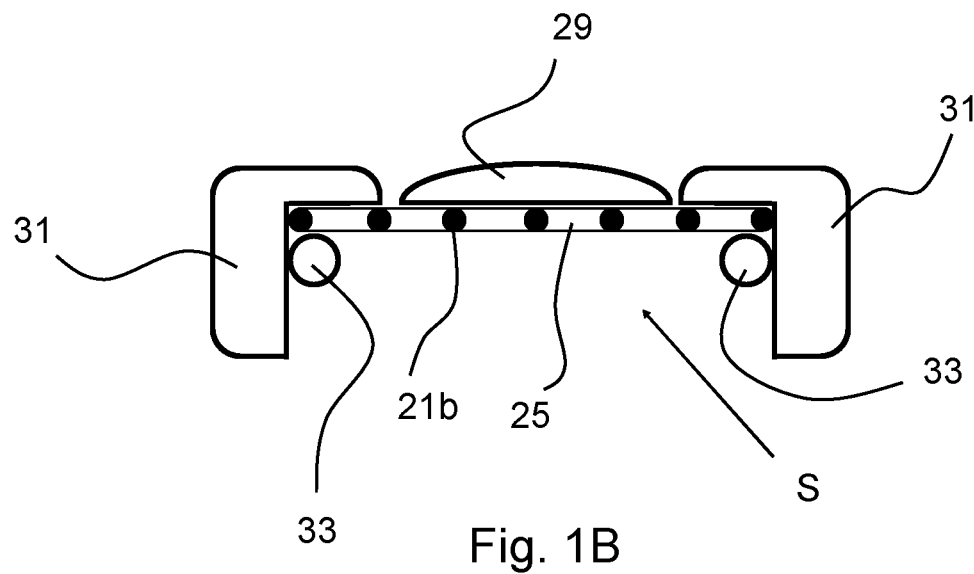

Now turning to FIG. 1B, an example of an EM-grid sample S with a mechanical contour 31 for improved handling is shown. Here, the grid S as described in FIG. 1A is enclosed in a first contour body 31 that is substantially circular and has an L-shaped cross-sectional area. This first contour body 31 is also referred to as clip ring 31, and is known to those skilled in the art. The grid S is provided within a recess of said mechanical contour 31, abutting a recess surface of said mechanical contour 31. A fixating element 33, in the form of a c-shaped clip 33 (also referred to as c-clip 33) holds the grid S firmly in place in the recess of the mechanical contour 31. A thin film 29 of aqueous liquid, comprising the sample/specimen to be studied, is provided on the backside or frontside of the grid S (here shown in an exaggerated way, drawing is not to scale).

Figure 2:
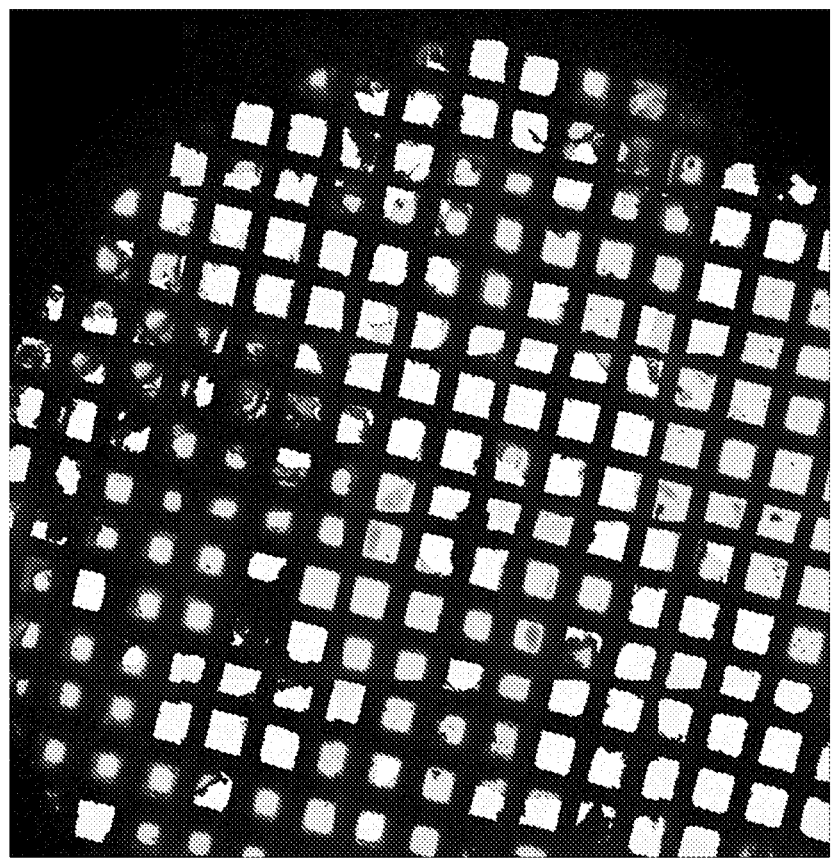
FIG. 2 shows sample damage that can result from application of a prior-art vitrification procedure.

Turning now to FIG. 2, this shows a particular sample of a type such as that illustrated in FIGS. 1A and 1B, after vitrification using the method set forth in the aforementioned US 2017/0169991 A1 (same flush applied to backside and frontside of sample). The light gray squares/cells are undamaged with successful vitrification procedure, whereas the white squares/cells are damaged where membrane breakage/de-lamination has occurred (to a greater or lesser extent). The dark/mottled squares/cells correspond to locations where vitrification happened but with too thick ice (to a greater or lesser extent). In the current situation, it is seen that of the order of ca. 25% of the squares/cells are sub-optimal. As set forth above, closer examination of the sample (not evident in the current Figure) reveals that the damaged squares/cells have been detached with a prevalent backside-to-frontside directionality. In contrast, FIG. 6 shows a particular sample of a type such as that illustrated in FIGS. 1A and 1B, after vitrification using the method as set forth herein, wherein use is made of the apparatus as described herein. It can be seen that most squares/cells are white and hence undamaged. Only a few cells show dark/mottled spots and significant less squares are damaged.

EMBODIMENT 1

FIGS. 3A-3C show aspects of an embodiment of a method and apparatus according to the present invention. Starting with FIG. 3A, this shows a pair of conduits 31a, 31b for transporting cryogenic fluid. Each of these conduits 31a, 31b has two extremal orifices, these being (respectively):
- (Lower) entrance orifices 37a, 37b, through which cryogenic fluid can enter the conduits 31a, 31b;
- (Upper) mouthpieces (exit orifices) 33a, 33b, through which cryogenic fluid can emerge from the conduits 31a, 31b. These mouthpieces 33a, 33b face each other across an intervening gap 35. The mouthpieces 33a, 33b are provided with nozzle plates 39a, wherein each of the nozzle plates 39a, 39b comprises at least two nozzle openings. These nozzle openings and possible embodiments thereof will be explained by means of FIGS. 5A-5D.

It should be noted that:
- For convenience, the various components 31a, 31b, 33a, 33b, 35, 37a, 37b are here depicted as residing in a body P, which may serve as a matrix/structure to keep them in place; for example, body P might be a plug/block of metal, ceramic or epoxy in which these various components have been created by casting, molding, machining or 3D-printing, for instance. However, this does not necessarily have to be the case, and the various components could instead be (quasi) free-standing structures.
- The orifices 37a, 37b; 33a, 33b are here depicted as being flared, but that does not necessarily have to be the case.
- The gap 35 is depicted as being of uniform width, but it could alternatively be tapered, for example. It should ideally be relatively narrow (in the Y direction), so as to improve initial flush synchronization and symmetry.

Also depicted in FIG. 3A is a tool T (such as a tweezers, pincers, pliers, clamp, robot arm, etc.) that can be used to grasp and manipulate a sample S, e.g. by gripping it along its edge, such as the mechanical contour 31 shown in FIG. 1B. This tool T can be used to position sample S in the gap 35 and between the mouthpieces 33a, 33b.

As already set forth above, one way to supply cryogenic fluid to the entrance orifices 37a, 37b is to simply connect them to (an electrical) cryogen pump (and associated cryogen reservoir) using suitable tubing/piping; one can then pump cryogen through the conduits 31a, 31b and out of the mouthpieces 33a, 33b so as to flush/shower (a sample S located in) the gap 35 with cryogenic fluid. However, in the current embodiment, use is instead made of a (manual) piston action to move cryogenic fluid through the conduits 31a, 31b. To this end, the body P is embodied as a plunger, which has an underside Pu (in which the entrance orifices 37a, 37b are located) and a topside Pt (through which it is possible to access gap 35). This plunger P can then, for example, be (partially) plunged/dipped into a container (tube, vessel) 5 of cryogen 7; as the plunger's underside Pu moves beneath the surface 9, cryogen 7 will be (progressively) forced through the entrance orifices 37a, 37b, though the conduits 31a, 31b and out of the mouthpieces 33a, 33b (see the progression from FIG. 3A to 3B to 3C, which illustrate part of this motion). Note in FIG. 3A that, prior to insertion of tool T/initiation of the plunging procedure, the conduits 31a, 31b have been primed/pre-filled with cryogen 7, e.g. as a result of pre-syphoning and/or capillary action from a previous plunging iteration. In this way, one ensures that a supply of cryogen is waiting in close proximity to the inserted position of the sample S, ready to gush out almost instantaneously, and thus lowering the risk of an unsynchronized flush from both sides of the sample S.

To produce the desired plunging motion, the depicted set-up uses the tool T to apply downward force to the plunger P—although this does not necessarily have to be the case, and one could instead push the plunger P downward by other means. As shown in FIGS. 3B and 3C, the tool T has a protrusion/lug T' that engages with a reciprocal area/part P' of the topside Pt of plunger P, allowing downward force on tool T to transfer downward momentum to plunger P: see the illustrative downward arrow T'' in FIGS. 3B, 3C. Moreover, the protrusion T' can (if so desired) be exploited to ensure that the sample S is inserted to an optimal depth in gap 35 (ideally substantially symmetrically between mouthpieces 33a, 33b) and can also be used to provide correct lateral positioning of the sample S in the gap 35 (once again, ideally with the (vitreous film of the) sample equidistant from mouthpieces 33a, 33b).

In a non-limiting example of a set-up such as that depicted here, the following illustrative (and approximate) values may apply:
- Sample S comprises a planar grid of diameter 3 mm and thickness 0.4 mm.
- Diameter of mouthpieces 33a, 33b: 3-4 mm.
- Diameter of conduits 31a, 31b: 2.5 mm.
- Separation of mouthpieces 31a, 31b/width of gap 35: 1 mm.
- Flow rate from mouthpieces 31a, 31b: ~5-15 m/s.

The skilled artisan will be able to tailor his own values to the requirements of a given situation.

In the embodiment shown in FIG. 3A-3D, the depicted apparatus has been configured such that the flush of cryogenic fluid applied from (left) mouthpiece 33a is different to that applied from (right) mouthpiece 33b—more specifically, to cause the flush from mouthpiece 33a to be of shorter duration than that from mouthpiece 33b. To this end, use is made of a shuttering mechanism (41, 43, 45) to close off (left) conduit 31a (which is connected to said (left) mouthpiece 33a) after elapse of a given time interval. More specifically, this shuttering mechanism comprises:

A lid (cover/blanker) 41, disposed at a selected nominal distance d below the surface 9 of the cryogen bath.

A rail/guide 43, which permits and guides motion of the lid 41 substantially parallel to the Z axis. To this end, the lid 43 may comprise an aperture 43' (or other suitable structure, such as a clasp or runner, for example) that co-operates with rail 43 so as to allow relative motion of the two.

An adjustable stop (such as a screw-locked sliding collar, for instance) that prevents upward motion of lid 41 beyond a certain point (at depth d).

As set forth above, the lid 41 may be naturally buoyant in cryogen 7 (e.g. because it is hollow) and/or may be biased upward using a spring, piston or magnetic arrangement, for example. In this way, lid 41 can co-move downward when it is engaged by plunger P, but will return/relax back upward when plunger P is disengaged therefrom. With particular reference to the individual Figures:

In FIG. 3B, such engagement has not yet occurred. The plunger P is moving downward through cryogen 7, forcefully introducing (more) cryogen into the conduits 31a, 31b. The associated pressure head causes cryogen to flush from both mouthpieces 31a, 31b, as illustrated in FIG. 3A by the hatched area filling the space between the mouthpieces 31a, 31b.

In FIG. 3C, the plunger P has engaged with lid 41, and the plunger P and lid 41 are co-moving downward (see arrow 47). Because of its size/positioning, the lid 41 only engages with left entrance orifice 37a, blocking/capping it and preventing flow of cryogen into it; on the other hand, right entrance orifice 37b is not impeded in this way. Consequently, the flush of cryogen from left mouthpiece 33a ceases, whereas the flush from right mouthpiece 33b continues. Note that the hatched area (flush) is now only coming from right mouthpiece 33b.

As set forth above, the skilled artisan can choose d and/or the downward velocity of plunger P so as to cause this termination of the flush from left mouthpiece 33a at a pre-selected time interval after commencement of flushing. This time interval may, for example, be of the order of 10-200 milliseconds.

It is noted that the use of the shuttering mechanism 41 as depicted in FIG. 3A-3C is entirely optional. Equal flush on both sides of the sample S is conceivable as well.

As schematically shown in FIG. 7, a seal element 91 may be provided at the surface level 9 of the cryogen bath. The seal element can be connected to the plunger P, and movable therewith. This way, the bath of cryogenic fluid with the plunger can form a closed piston. The seal 91 can be provided in the form of one Teflon-O ring, for example. This O-ring (tight at LN2 temperature) prevents spraying and splashes. The O-ring also can ensure a more controlled ethane flow from the nozzles, wherein this flow is only determined by the ratio plug diameter/nozzle opening time and the plug downwards velocity.

As is also shown in FIG. 7, a further seal element 93 can be provided. This further seal element 93 is provided above said first seal element 91. The further seal element 93 can be connected to and movable with the piston P. This seal element 93 can be an O-ring as well, wherein this further O-ring allows release of liquid ethane after the downwards action of the plunger P, in particular when resetting the plug back to the upward position, but prevent ethane leaks away while pushing downwards. In the embodiment shown, the plunger comprises a couple of further channels 38a, 38b (wherein these channels are separate from the two conduits) that are connected to the channel formed by the intervening gap 35. The bath of cryogenic fluid is provided with one or more exhaust outlets 83a. Since the at least two seal elements 91, 93 are movably connected with the plunger P, and a vertical distance is present between the two seals 91, 93, there will be a relative position between the plunger P and the cryogenic bath wherein the seal elements 91, 93 determine a flow channel 81a, 81b that connects the further channels 38a, 38b to the respective exhaust outlets 83a, 83b. This is beneficial, for example, when the plunger P is filled with cryogenic fluid and the plunger is moved upwards. Cryogenic fluid present in the intervening gap 35 may now be easily removed from the system when the plunger is in the position shown in FIG. 7. When the plunger is moved further upwards, the first seal element 91 once again closes off the exhaust outlet 83a. When the plunger is moved further downwards, the flow channel to the exhaust outlet 83a, 83b is also closed off.

It is noted that the plunger device as described herein can be effectively used as a jet freezing device. One further advantage of the plunger device as described herein is that in a submerged position of the plunger in the cryogenic bath, it becomes possible to use the device as described herein as a plunge freezing device as well. To this end, the tool may be simply entered into the plunger device for establishing plunge freezing. In an alternative embodiment, the cryogenic bath may be provided with a pumping device to establish forced flow through the conduits of the plunger, so that jet freezing may occur without actually moving the plunger into the bath.

EMBODIMENT 2

FIG. 4 is a highly schematic depiction of an embodiment of a CPM which can be used to examine a sample prepared in accordance with the present invention; more specifically, it shows an embodiment of a transmission-type microscope M, which, in this case, is a TEM/STEM (though, in the context of the current invention, it could just as validly be an ion-based microscope, for example). In the Figure, within a vacuum enclosure V, an electron source 2 (such as a Schottky emitter, for example) produces a beam C of electrons that traverse an electron-optical illuminator 4, serving to direct/focus them onto a chosen part of a specimen S (which may, for example, be (locally) thinned/planarized). This illuminator 4 has an electron-optical axis C', and will generally comprise a variety of electrostatic/magnetic lenses, (scan) deflector(s) D, correctors (such as stigmators), etc.; typically, it can also comprise a condenser system (the whole of item 4 is sometimes referred to as "a condenser system").

The specimen S is held on a specimen holder H that can be positioned in multiple degrees of freedom by a positioning system/stage A; for example, the specimen holder H may comprise a finger that can be moved (inter alia) in the XY plane (see the depicted Cartesian coordinate system; typically, motion parallel to Z and (at least) tilt about X/Y will also be possible). Such movement allows different parts of the specimen S to be irradiated/imaged/inspected by the electron beam traveling along axis C' (in the Z direction) (and/or allows scanning motion to be performed, as an alternative to beam scanning). A cooling device H' is in intimate thermal contact with the specimen holder H, and is capable of maintaining the latter at cryogenic temperatures, e.g. using a vat of cryogenic coolant to achieve and maintain a desired low temperature.

The (focused) electron beam C traveling along axis C' will interact with the specimen S in such a manner as to cause various types of "stimulated" radiation to emanate from the specimen S, including (for example) secondary electrons, backscattered electrons, X-rays and optical radiation (cathodoluminescence). If desired, one or more of these radiation types can be detected with the aid of analysis device 6, which might be a combined scintillator/photomultiplier or EDX (Energy-Dispersive X-Ray Spectroscopy) module, for instance; in such a case, an image could be constructed using basically the same principle as in a SEM. However, alternatively or supplementally, one can study electrons that traverse (pass through) the specimen S, emerge (emanate) from it and continue to propagate (substantially, though generally with some deflection/scattering) along axis C'. Such a transmitted electron flux enters an imaging system (combined objective/projection lens) 8, which will generally comprise a variety of electrostatic/magnetic lenses, deflectors, correctors (such as stigmators), etc. In normal (non-scanning) TEM mode, this imaging system 8 can focus the transmitted electron flux onto a fluorescent screen 10, which, if desired, can be retracted/withdrawn (as schematically indicated by arrows 10') so as to get it out of the way of axis C'. An image (or diffractogram) of (part of) the specimen S will be formed by imaging system 8 on screen 10, and this may be viewed through viewing port 12 located in a suitable part of a wall of enclosure V. The retraction mechanism for screen 10 may, for example, be mechanical and/or electrical in nature, and is not depicted here.

As an alternative to viewing an image on screen 10, one can instead make use of the fact that the depth of focus of the electron flux emerging from imaging system 8 is generally quite large (e.g. of the order of 1 meter). Consequently, various other types of analysis apparatus can be used downstream of screen 10, such as:

TEM camera 14. At camera 14, the electron flux can form a static image (or diffractogram) that can be processed by controller E and displayed on a display device (not depicted), such as a flat panel display, for example. When not required, camera 14 can be retracted/withdrawn (as schematically indicated by arrows 14') so as to get it out of the way of axis C'.

STEM imager (camera) 16. An output from imager 16 can be recorded as a function of (X,Y) scanning position of the beam C on the specimen S, and an image can be constructed that is a "map" of output from imager 16 as a function of X,Y. Imager 16 can, for example, comprise a single pixel with a diameter of e.g. 20 mm, as opposed to the matrix of pixels characteristically present in camera 14. Moreover, imager 16 will generally have a much higher acquisition rate (e.g. 106 points per second) than camera 14 (e.g. 102 images per second). Once again, when not required, imager 16 can be retracted/withdrawn (as schematically indicated by arrows 16') so as to get it out of the way of axis C' (although such retraction would not be a necessity in the case of a donut-shaped annular dark field imager 16, for example; in such an imager, a central hole would allow beam passage when the imager was not in use).

As an alternative to imaging using camera 14 or imager 16, one can also invoke spectroscopic apparatus 18, which could be an EELS module, for example (EELS=Electron Energy-Loss Spectroscopy).

It should be noted that the order/location of items 14, 16 and 18 is not strict, and many possible variations are conceivable. For example, spectroscopic apparatus 18 can also be integrated into the imaging system 8.

Note that the controller (computer processor) E is connected to various illustrated components via control lines (buses) E'. This controller E can provide a variety of functions, such as synchronizing actions, providing setpoints, processing signals, performing calculations, and displaying messages/information on a display device (not depicted). Needless to say, the (schematically depicted) controller E may be (partially) inside or outside the enclosure V, and may have a unitary or composite structure, as desired. The skilled artisan will understand that the interior of the enclosure V does not have to be kept at a strict vacuum; for example, in a so-called "Environmental TEM/STEM", a background atmosphere of a given gas is deliberately introduced/maintained within the enclosure V. The skilled artisan will also understand that, in practice, it may be advantageous to confine the volume of enclosure V so that, where possible, it closely embraces the axis C', taking the form of a small tube (e.g. of the order of 1 cm in diameter) through which the employed electron beam passes, but widening out to accommodate structures such as the source 2, specimen holder H, screen 10, camera 14, imager 16, spectroscopic apparatus 18, etc.

The specimen S shown in FIG. 4 can, for example, be a specimen that has undergone a vitrification procedure according to the present invention. Such a specimen can be maintained at cryogenic temperatures while it is in the CPM M (and also while it is being transported/stored) thanks to the cooling device H'. To this end, one can, for example, employ an embodiment such as the following: The cooling device H' comprises a dewar/flask that is intimately thermally connected (e.g. via a copper rod and/or braid) to holder H, and that can be filled with a cryogen. The composite structure H+H' can be inserted into/removed from the CPM M, whereby it can be seated into/clamped by a receiver portion of positioning system A.

Refer, for example, to the set-up discussed in United States Patent Application US 2012/0112064 A1, and similar such set-ups which are known per se to those skilled in the art.

FURTHER EMBODIMENTS

Figure 5A:
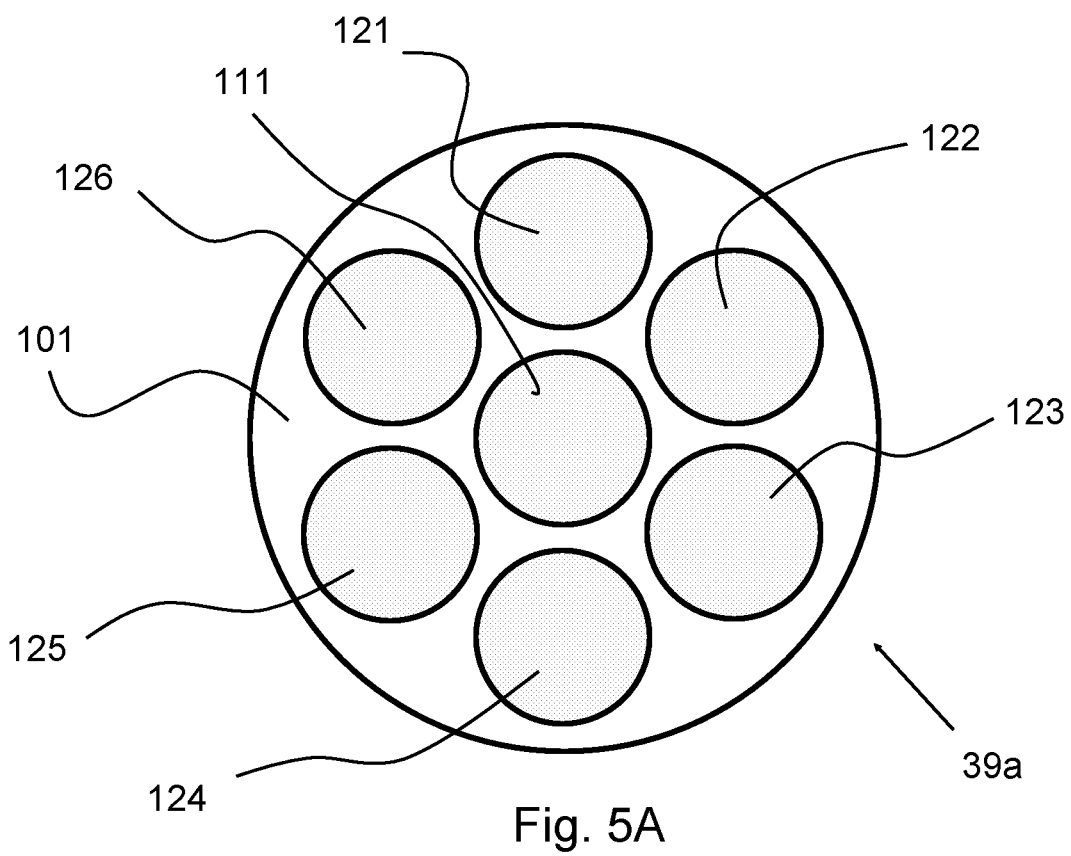

Now turning to FIGS. 5A-5D, embodiments of the nozzle openings as defined herein will be described. FIG. 5A shows an embodiment of a mouthpiece 39a, wherein the mouthpiece comprises a nozzle plate 101 with a single central nozzle opening 111, and a total of six peripheral nozzle openings 121-126 arranged evenly distributed about said central nozzle opening 111. It is noted in this embodiment that all of the nozzle openings 111, 121-126 are substantially equal in diameter. Additionally, this embodiment, having a total of seven nozzle openings that are substantially equally sized, makes use, most effectively, of the total area of the mouthpiece 39a for evenly distributing the cooling force over the entire surface of the sample, so that a peripheral part of the sample carrier is cooled at least at the same time as a central part of the sample carrier. This leads to improved vitrification of the sample, compared to known techniques.

Figure 5B:
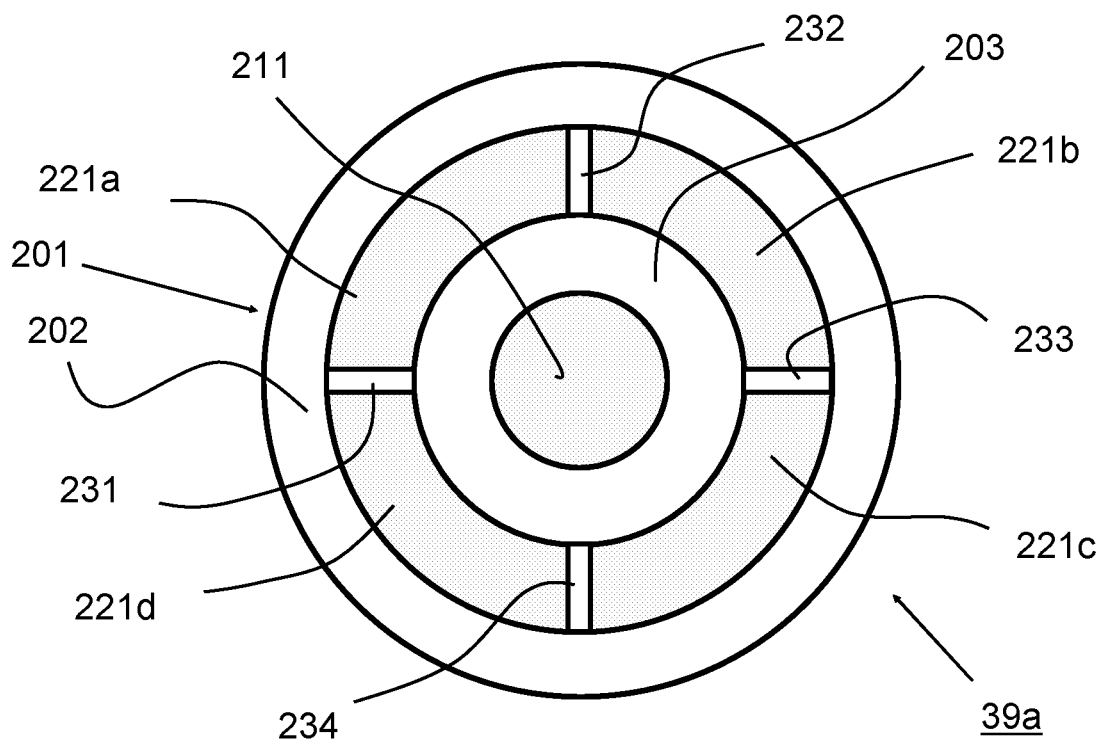

FIG. 5B shows an embodiment of a mouthpiece 39a, wherein the mouthpiece comprises a nozzle plate 201 with two nozzle openings: a central nozzle opening 211, and a single peripheral nozzle opening 221. The nozzle plate 201 has a central part 203 and a peripheral part 202 as well, which parts are connected by mechanical studs 231-234 to enable the central nozzle plate 203 to maintain its position. The studs 231-234 effectively subdivide the single peripheral nozzle into four sub-openings 221a-221d, even though in fact a single opening is present.

Figure 5C:
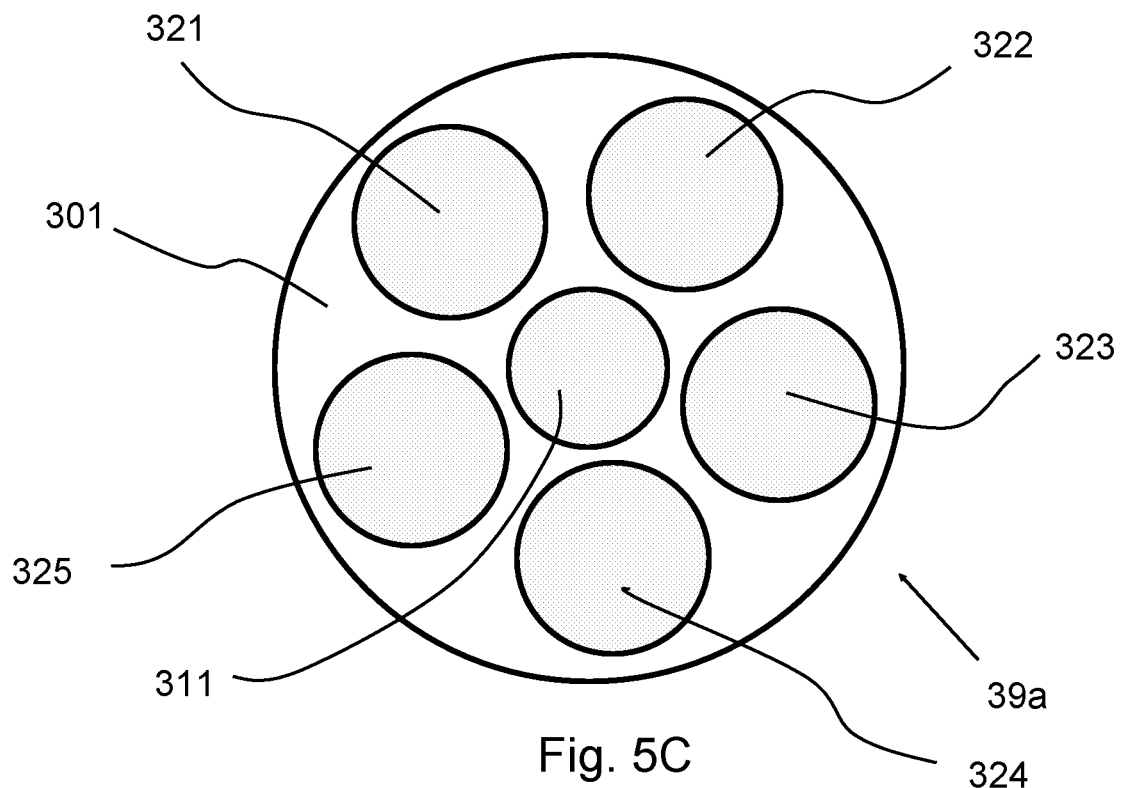

FIG. 5C shows an embodiment of the mouthpiece 39a having a total of six nozzle openings 311, 321-325: a single central nozzle opening 311 and a total of five peripheral nozzles that are provided evenly distributed about the central nozzle opening 311. The peripheral nozzle openings 321-325 are larger in dimension compared to the central nozzle 311. This way the peripheral part of the sample carrier is cooled at least at the same time as the central part of the sample carrier.

It is noted that as defined herein, the central part and the peripheral part of the sample carrier can be defined as follows. The central part coincides with an innermost part corresponding to approximately ⅓ of the total radius of the circle, and the peripheral part coincides with the outermost part corresponding to approximately ⅔ of the total radius of the circle. This can be seen most clearly in FIG. 5A, where the central nozzle opening 111 (having an arbitrary radius r) takes up a central part of the mouthpiece 101, and the peripheral nozzle openings 121-126 (also having the same arbitrary radius r) take up a peripheral part of the mouthpiece 101. Thus, the total radius of the mouthpiece 101 corresponds to approximately three times the arbitrary radius r (one time the radius of the central nozzle opening 111, and two times the radius of the peripheral nozzle opening 121). The central part may be 20% larger or smaller, in embodiments, meaning that the central radius may be 20% larger or smaller.

Figure 5D:
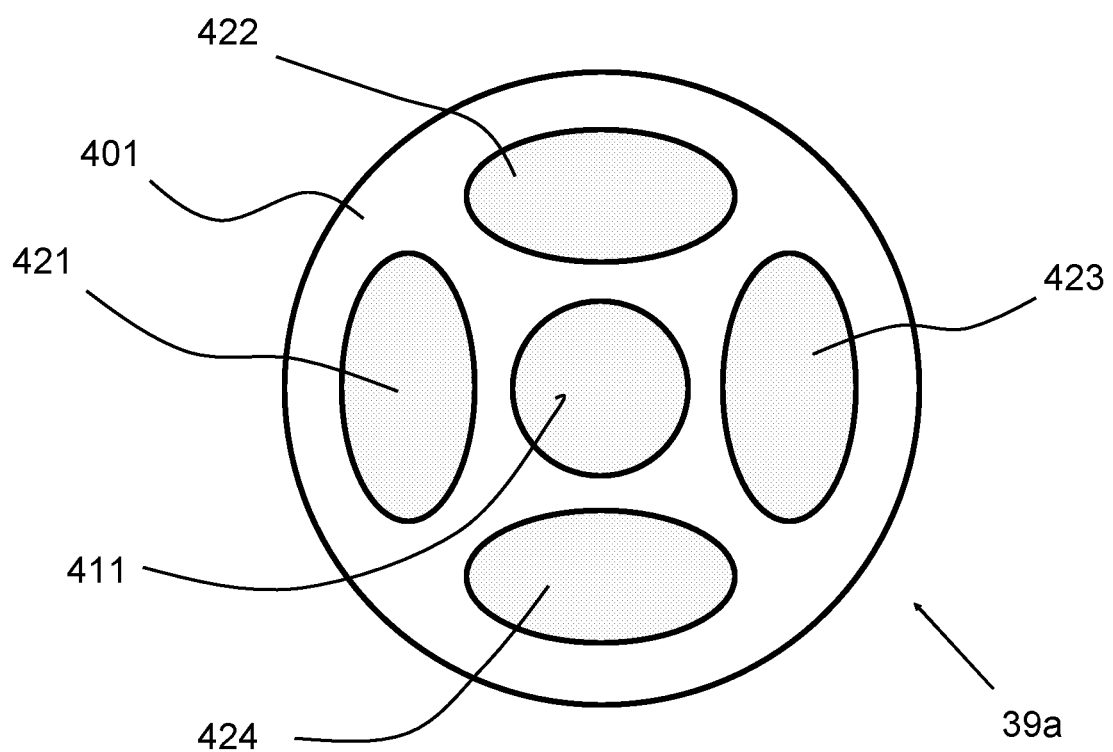

FIG. 5D shows an embodiment with a total of five nozzle openings 411, 421-424, wherein the central nozzle opening 411 is circular, and the peripheral nozzle openings 421-424 are oval. Here, the central nozzle thus has a different shape compared to the peripheral nozzles.

Figure 5E:
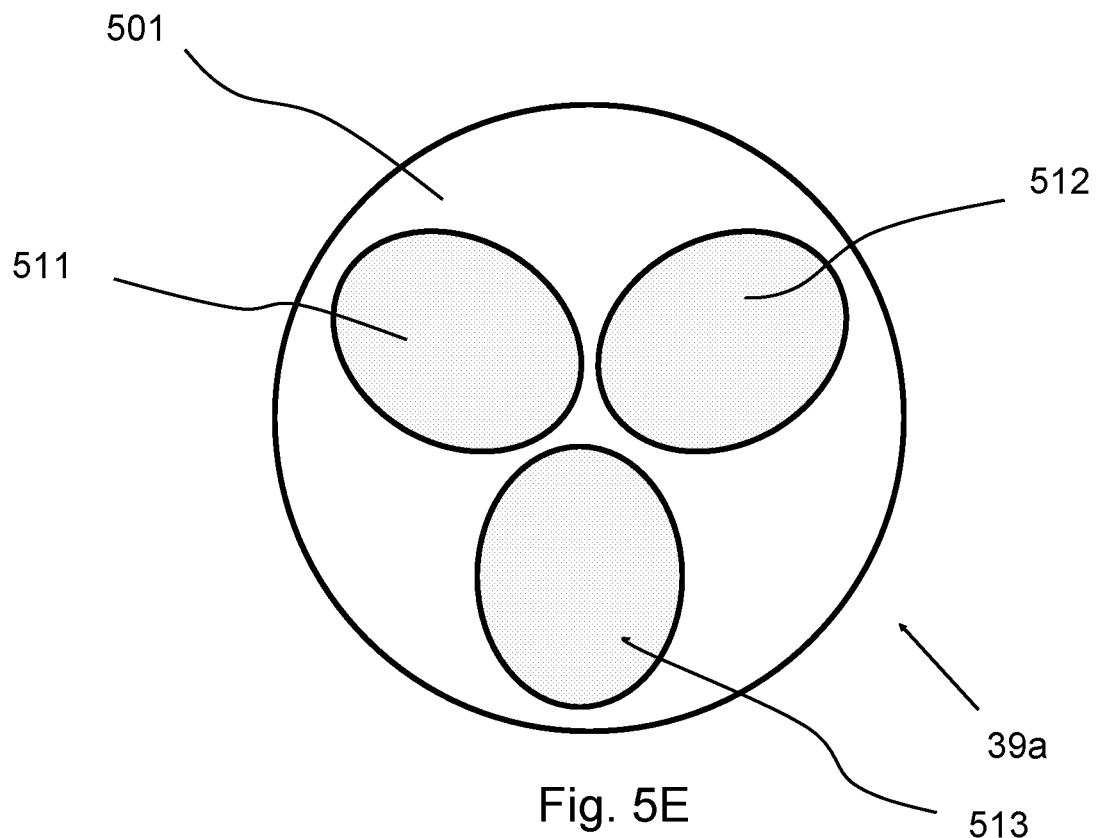

FIG. 5E shows an embodiment of a mouthpiece 39a with a nozzle plate 501 that comprises a total of three oval nozzles 511-513. Hence, no central nozzle opening is present, in this embodiment.

Figure 5F:
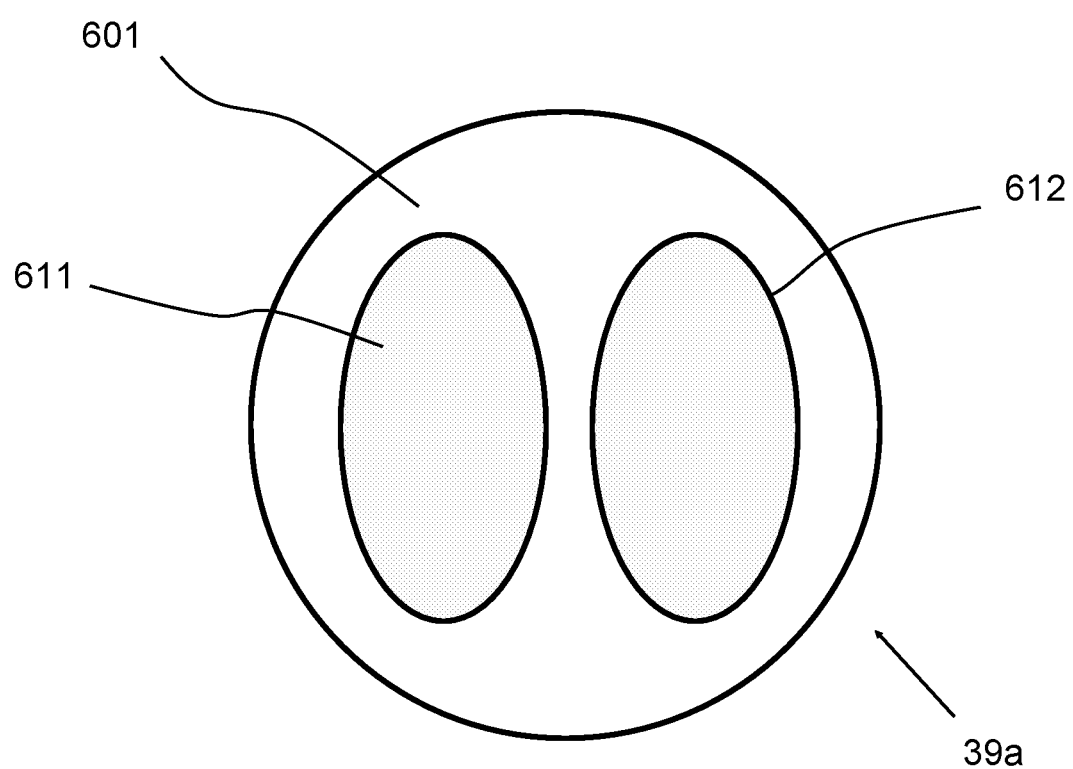

FIG. 5F shows another embodiment with an absence of central nozzle openings. Here, a total of two nozzle openings 611, 612 are provided in the nozzle plate 601, defining a mouthpiece 39a having at least two nozzle openings 611, 612.

It is noted that, with reference to the embodiments shown in FIG. 5A-5F, the at least two nozzle openings may be embodied in several different ways. The at least two nozzles may be embodied according to one or more of the embodiments shown in FIG. 5A-5F, or combinations thereof. In particular:

A total of two or more nozzles may be present;
Up to seven nozzles in total may be present, although additional nozzles are conceivable as well;
At least one central nozzle may be present, although one or more additional central nozzles are conceivable as well;
One or more peripheral nozzles may be present, and in particular up to six, or even more, peripheral nozzles are conceivable;
Nozzles may have a corresponding or mutually different shape, although in principle corresponding shapes provide more predictable results;
Nozzles may, in principle, have any suitable geometric shape, although round nozzles provide more predictable results.

As described herein, the other one of the two mouthpieces may comprise two nozzle openings as well. These at least two further nozzles may be embodied according to one or more of the embodiments shown in FIG. 5A-5F, or combinations thereof. The first mouthpiece may be exactly or substantially equal to the second mouthpiece. Alternatively, the first mouthpiece is embodied different to the second mouthpiece.

The desired protection is conferred by the appended claims.

We claim:

1. A method of preparing a cryogenic sample, whereby said sample is subjected to rapid cooling using a cryogen, the method comprising:
   providing a sample on a substantially planar sample carrier;
   providing two conduits for transporting cryogenic fluid, each of which conduits opens out into a mouthpiece, wherein:
      said mouthpieces are arranged to face each other across an intervening gap;
      at least one of said mouthpieces comprises at least two nozzle openings;
      said conduits are arranged in a vessel; and
      said vessel; is externally fitted with at least one seal element for preventing cryogenic fluid to leak when cryogenic fluid is pumped through said conduits;
   placing said sample carrier with said sample in said gap; and
   pumping cryogenic fluid through said conduits so as to concurrently flush from said mouthpieces, thereby suddenly immersing said sample in cryogenic fluid from two opposite sides, wherein said nozzle openings are configured to evenly cool said sample during said flushing.

2. The method of claim 1, wherein said nozzle openings comprise a central nozzle that is arranged for cooling a central part of said substantially planar sample carrier, and at least one peripheral nozzle that is arranged for cooling a peripheral part of said substantially planar sample carrier.

3. The method of claim 1, wherein said nozzle openings are arranged for providing substantially identical flushes of cryogenic fluid on said substantially planar sample carrier.

4. The method of claim 1, wherein said nozzle openings are arranged for providing substantially unequal flushes of cryogenic fluid on said substantially planar sample carrier.

5. The method of claim 1, wherein:
   each of said conduits has an entrance aperture on an underside of said vessel; and said gap is provided as a slot in a topside of said chamber;
   a bath of cryogenic fluid is provided beneath said chamber; and
   said sample is inserted into said slot using a tool that applies downward pressure on said chamber, thereby at least partially submerging the chamber and causing cryogenic fluid in said bath to flow into said entrance apertures and emerge through said mouthpieces.

6. The method of claim 5, wherein said flushing commences substantially simultaneously from both mouthpieces, and said flushing from a first one of said mouthpieces is terminated upon expiration of a given time interval, by using a shutter to close off a first of said conduits, connected to said first mouthpiece, upon expiration of said time interval.

7. The method of claim 6 wherein, as said vessel; is submerged into said bath, a first of said apertures, connected to said first conduit, engages with a lid disposed at a selected distance below a surface of said bath, which lid then co-moves with the chamber so as to keep said first aperture closed.

8. The method of claim 1, wherein said vessel; is externally fitted with at least one further seal element that is positioned at a distance from said at least one seal element, wherein said vessel; and said at least one further seal element are arranged for removing excess cryogenic fluid from said chamber after said pumping cryogenic fluid through said conduits.

9. The method of claim 1, wherein said vessel; is surrounded by said at least one seal element.

10. An apparatus for preparing a cryogenic sample, whereby said sample is subjected to rapid cooling using a cryogen, the apparatus comprising:
   a pair of conduits configured to transport cryogenic fluid, each of which conduits opens out into a mouthpiece, wherein:
      at least one of said mouthpieces comprises at least two nozzle openings;
      said mouthpieces are arranged to face each other across an intervening gap;
      said apparatus is configured to receive a sample, mounted on a substantially planar sample carrier, in said intervening gap;
      said conduits are arranged in a vessel; and
      said vessel; is externally fitted with at least one seal element for preventing cryogenic fluid to leak when cryogenic fluid is pumped through said conduits;
   a pumping mechanism configured to pump cryogenic fluid through said conduits so as to concurrently flush from said mouthpieces and suddenly immerse said sample in cryogenic fluid from two opposite sides, wherein said nozzle openings are configured to evenly cool said sample during said flushing.

11. The apparatus of claim 10, wherein said nozzle openings comprise a central nozzle that is arranged for cooling a central part of said substantially planar sample carrier, and at least one peripheral nozzle that is arranged for cooling a peripheral part of said substantially planar sample carrier.

12. The apparatus of claim 11, wherein said central nozzle and said peripheral nozzles are substantially identical in size.

13. The apparatus of claim 11, wherein said at least one peripheral nozzle comprises at least six peripheral nozzles that are evenly arranged about said central nozzle.

14. The apparatus of claim 10, wherein said at least two nozzle openings are arranged for providing substantially identical flushes of cryogenic fluid on said substantially planar sample carrier.

15. The apparatus of claim 10, wherein said at least two nozzle openings are arranged for providing substantially unequal flushes of cryogenic fluid on said substantially planar sample carrier.

16. The apparatus of claim 10, wherein:
   each of said conduits has an entrance aperture on an underside of said vessel; and said gap is provided as a slot in a topside of said vessel;
   a bath of cryogenic fluid is provided beneath said vessel; and
   said sample is inserted into said slot using a tool that applies downward pressure on said vessel; thereby at least partially submerging the vessel and causing cryogenic fluid in said bath to flow into said entrance apertures and emerge through said mouthpieces.

17. The apparatus of claim 16, wherein said flushing commences substantially simultaneously from both mouthpieces, and said flushing from a first one of said mouthpieces is terminated upon expiration of a given time interval, by using a shutter to close off a first of said conduits, connected to said first mouthpiece, upon expiration of said time interval.

18. The apparatus of claim 17 wherein, as said vessel; is submerged into said bath, a first of said apertures, connected to said first conduit, engages with a lid disposed at a selected distance below a surface of said bath, which lid then co-moves with the chamber so as to keep said first aperture closed.

19. The apparatus of claim 10, wherein said vessel; is externally fitted with at least one further seal element that is positioned at a distance from said at least one seal element, wherein said vessel; and said at least one further seal element are arranged for removing excess cryogenic fluid from said chamber after said pumping cryogenic fluid through said conduits.

20. The apparatus of claim 10, wherein said vessel; is surrounded by said at least one seal element.

* * * * *